Nov. 30, 1943.   A. COOPER   2,335,649
PRODUCTION OF GAS-EXPANDED RUBBER AND RUBBER-LIKE MATERIALS
Filed April 12, 1940
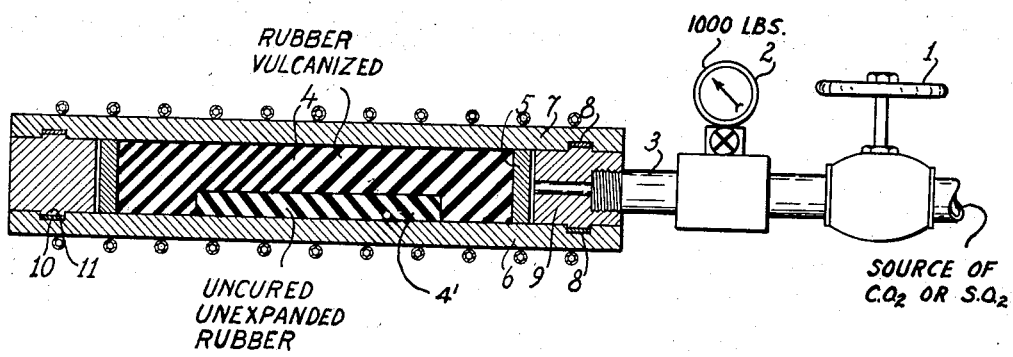
INVENTOR.
Alfred Cooper
BY
Ostrolenk & Greene
ATTORNEYS Patented Nov. 30, 1943

2,335,649

UNITED STATES PATENT OFFICE 2,335,649

PRODUCTION OF GAS-EXPANDED RUBBER AND RUBBERLIKE MATERIALS

Alfred Cooper, Croydon, England, assignor to Rubatex Products Inc., New York, N. Y., a corporation of Delaware Application April 12, 1940, Serial No. 329,228
In Great Britain April 24, 1939

2 Claims. (Cl. 18—53)

The present invention relates to the production of gas-expanded rubber and rubber-like materials.

The term "rubber" as used in this specification is intended to include in addition to natural caoutchouc, the various rubber-like synthetic materials which are hardened by a vulcanisation process as distinct from the ordinary heating of a synthetic resin.

Various processes have been proposed hitherto for the preparation of gas-expanded rubber in which the rubber dough is partially vulcanised either previous to or simultaneously with the gas impregnation process and the partially vulcanised and/or partially gas-expanded material is then submitted to a final vulcanisation and expansion process in a hydraulic press.

It is one object of the present invention to avoid the necessity of removing the rubber from one apparatus to another in between the gas impregnating and final vulcanising operations. Not only is this disadvantageous from the economic point of view but, as will be shown hereinafter, certain operations which are more advantageously employed cannot be successfully carried out in the methods hitherto employed.

According to the present invention a process for preparing gas-expanded rubber materials comprises partly filling a mould with the raw, i. e., unvulcanised, rubber dough, sealing the mould to prevent any substantial escape of gas therefrom and introducing a gas into the mould under pressure, sufficient to penetrate the rubber dough and at a temperature to soften the rubber but insufficient to complete the vulcanisation (for example, 100–120° C.) and when the required penetration is attained, raising the temperature to the vulcanisation temperature and finally cooling the mould below the softening temperature of the vulcanised material.

The extent to which the mould is charged with the raw dough depends upon the density of the product to be produced. Generally speaking, the material found suitable for most purposes, when fully expanded is about thirteen and a half times its original volume, and during the actual impregnation and partial vulcanisation the material expands to about six times its original volume. In order, therefore, to produce an average density material for this class of product, namely, about 10 pounds per cubic foot, it will be necessary to fill the mould to only about one-sixth of its capacity with the rubber dough. Densities as low as 3½–4 lbs. per cu. ft. can be obtained by suitably adjusting the amount placed in the mould and the impregnation step.

The gas may be introduced into the mould by direct pumping for which purpose pressures of 500–5000 lbs. per sq. in. may be necessary according to the gas employed, as hereinafter explained. Where sufficient pressure is obtainable as in the case of carbon dioxide and sulphur dioxide the gas may be introduced in the solid, liquid or gaseous state from cylinders of compressed gas.

When the temperature has been raised to bring about the final vulcanisation, it may be desirable to release the gas pressure partly or entirely in order that the rubber may expand against the sides of the mould while it is still sufficiently soft to take the shape of the mould. It is, however, essential before doing so that the rubber dough shall be sufficiently vulcanised to retain the gas.

In carrying out the process according to the invention, the rubber direct from the calendering may be placed in a curing frame which is fitted with top and bottom plates provided with special grooves or recesses and provided with a copper or lead gasket, to produce a perfectly gastight joint suitable for pressures of the order of 1000–5000 lbs. per sq. in. The frame itself may be provided with small projections on the top and bottom surfaces which will press into the soft metal gasket. On one side of the moulding frame there is a gas inlet connected to a gas cylinder or gas compressor with high pressure metal tubing. A pressure gauge and valve are fitted between the frame and the gas inlet valve. A second frame of much thinner material may be fitted inside the curing frame in order to prevent the rubber during expansion from blocking the gas inlet.

When the calendered rubber sheet, cut to the required shape and size, has been placed in the frame, the top and bottom plates are brought into position and the whole assembly supported, e. g., between the platens of a press, to withstand the gas pressure employed in the gassing operation. The gas inlet is then connected to the source of high pressure gas and gas introduced until a pressure of 500–5000 lbs. per sq. in. is reached. The actual pressure employed will depend upon the gas used, because certain gases, such as carbon dioxide and sulphur dioxide are much more soluble in the rubber than, for example, nitrogen. The ram pressure, where a press is employed to support the mould, should be 50–100 lbs. per sq. in. in excess of the gas pressure and the gas should not be turned on before the press is tightly closed and the mould completely sealed.

When it is desirable to use a very high pressure of gas in the mould and the ram pressure is not sufficient to hold it, the press may be held tightly closed by the auxiliary support of the moving platen by means, for example, of hydraulic jacks.

When the gas pressure has reached the correct maximum required pressure, the press platens are heated by steam in the usual way, thus softening the rubber which will readily absorb any gas. The heat of the press is maintained at, say 100–120° C. for the requisite gassing period which with the more soluble gases will take only 1–2 hours to penetrate half an inch in thickness of the calendered sheet.

When the gassing period has terminated the gas is turned off and the press platen is heated to the vulcanisation temperature.

The cures will vary considerably with the quality of the material but will be about 1 hour at 50–100 lbs. per sq. in. of steam. As the rubber expands filling the mould, the gas may be let out sufficiently for the rubber to expand against the sides of the mould provided the rubber is sufficiently vulcanized to prevent bursting or uniting of the small bubbles of gas in the rubber. At the completion of the curing it is necessary to cool the mould before removing the expanded rubber.

Any desired gas may be used for the gassing operation in the case of hard rubber material, but for soft rubber it will be necessary to choose a gas such as nitrogen, argon or helium which does not readily diffuse out of the rubber.

One advantage of the process according to the invention is that sulphur-dioxide may be used in the gassing and thus means are opened up for eliminating the odour of hydrogen sulphide which is always liable to occur in the preparation of hard expanded rubber. In processes as hitherto carried out the employment of the sulphur dioxide was attended with difficulty because on removing the gassed material from the autoclave in order to transfer it to the moulding press the sulphur dioxide, which is quickly absorbed in the gassing process, diffuses out with the same readiness and this diffusion takes place to the greatest extent during the succeeding curing process. In the process according to this invention this diffusion is entirely eliminated as there is no removing of the rubber after the gas is absorbed but the curing follows immediately without interruption of the gassing operation. Furthermore, if substances of the nature of hydrosulphites, which give off sulphur-dioxide when heated, are mixed into the rubber batch, such mixes absorb gases readily but when undergoing the curing process the sulphur-dioxide escapes or diffuses through the mass producing an article which is partially collapsed and not blown to the required thickness.

The process according to the invention enables a greater latitude in the preparation of the rubber mixes and the mix may be made softer to reduce the impregnation time to a minimum without fear of diffusion as the material is not removed from the sealed mould until completely cured.

One form of apparatus suitable for carrying out the invention is shown in the accompanying drawing being a side elevation (partly in section) of a circular mould suitable for insertion between the platens of a hydraulic press.

In the drawing, a high pressure valve 1, is connected through a pressure gauge 2 to an inlet pipe 3 which is connected to a moulding frame 9. The moulding frame is provided with a ring or frame 5 which fits loosely within the frame 9 and holds the rubber after expansion. Plates 6 and 7 at the bottom and top respectively, of the mould frame are provided with grooves 8 holding copper gaskets which contact with the ridges 10 on the projections 11 on the upper and lower sides of the frame 9, which projections coincide with the grooves 8.

In operation, the rubber mix 4' is placed within the frame 5 on the base plate 6 and the mould is assembled together between the platens of a press and gas (for example, nitrogen) is introduced under pressure from cylinders or compression pumps through the high pressure valve 1, the pressure being regulated according to the readings on the pressure gauge 2 to give the required pressure; sufficient pressure being applied to the platens of the press to maintain tight closure on the copper gaskets. The rubber is then expanded according to the processes herein described so that the rubber mass 4 fills out the frame 5 and fills the space between platens 6 and 7 while the platens 6 and 7 are heated in any suitable manner as by the steam coils 12.

The following examples in which a hard and soft rubber mix respectively, were employed, will show how the invention may be carried out using the apparatus above described:

*Example 1*

A hard rubber mix consisting of rubber, 60%; sulphur, 25%; hydrocarbon, 6%; calcined magnesia, 3%; ceresene wax, 1%; and colouring matter, 5%, was calendered and a 4" diameter disc ½" thick, weighing approximately 3 ounces, was cut therefrom and placed in the pressure mould, the internal dimensions of the frame 5 (see figure) of which is 8" in diameter and 1½" thick. The mould was closed as described and sulphur-dioxide from a cylinder was introduced until a pressure of 10 pounds was recorded on the gauge connected to the mould. Carbon dioxide was then introduced by a branch pipe at the same inlet until the pressure reached 1000 pounds per square inch. This pressure was maintained for one hour whilst the press platen was heated to a temperature of 115° C., and maintained so throughout the gassing period. The temperature of the platen was then raised to 170° C. for the final vulcanisation whilst the gas was allowed to escape to atmosphere slowly, taking about 20 minutes. The sample was then vulcanised for one hour at 170° C. without removing it from the mould, whereupon the steam was turned off and water allowed to circulate in the platen for half an hour to cool the mould before the sample was extracted.

*Example 2*

Soft expanded material was also produced in the same way from a mix consisting of rubber, 55%; sulphur, 3.5%; vulcanised oil (sub.), 9%; golden antimony (containing 15–17% sulphur), 13%; ceresene wax, 2%; and magnesium carbonate, 17.5%. The sample in this case cut from the calendered sheet was 6" diameter, ⅝" thick, weighing about 6 ounces. Ordinary pure nitrogen was introduced into the mould and maintained at 1000 pounds per square inch for one hour at a temperature of 102° C., whereupon the temperature was raised to 145° C. for a further hour during which vulcanisation was effected, the gas being removed slowly taking about 20 minutes as in the previous example. Water was then circulated in the press platens to ensure that the sample was quite cold before being extracted.

In these examples on account of the small quantity of gas used, the gas was allowed to escape into the atmosphere, but under working conditions a separate exit pipe connected to the mould leads into a gasometer or storage vessel, thus eliminating the waste.

I claim:

1. The method of making closed cell gas expanded rubber which comprises placing the rubber in a mold, gassing the rubber with sulphur dioxide and carbon dioxide at a pressure of the order of 1,000 pounds per square inch, heating the rubber to render the rubber plastic, shutting off the gas and expanding the rubber in the mold, and finally vulcanizing the expanded closed cell rubber.

2. A process for preparing gas-expanded rubber materials which comprises partly filling a mold with a hard rubber mix in the form of unvulcanized rubber dough, sealing the mold to prevent any substantial escape of gas therefrom and introducing sulphur dioxide into the mold under pressure of the order of 1000 to 5000 pounds per square inch to penetrate the rubber dough and at a temperature of 100–120° C. sufficient to soften the rubber but insufficient to complete the vulcanization and when the required penetration is attained gradually releasing the gas pressure to permit the escape of gas for a period extended over twenty minutes and raising the temperature to the vulcanization temperature, continuing the vulcanizing temperature for a period of the order of one hour and thereafter cooling the mold below the softening temperature of the vulcanized material and finally removing the hard vulcanized material from the mold.

ALFRED COOPER.